US00RE34599E

United States Patent [19]

Suszynski et al.

[11] E Patent Number: Re. 34,599

[45] Reissued Date of Patent: May 3, 1994

[54] DISPOSABLE PROBE COVER ASSEMBLY FOR MEDICAL THERMOMETER

[75] Inventors: Edward D. Suszynski, Vista; Richard P. Meyst, Valley Center, both of Calif.

[73] Assignee: Diatek Incorporated, San Diego, Calif.

[21] Appl. No.: 856,718

[22] Filed: Mar. 25, 1992

Related U.S. Patent Documents

Reissue of:

[64] Patent No.: 4,911,559
Issued: Mar. 27, 1990
Appl. No.: 265,525
Filed: Nov. 1, 1988

[51] Int. Cl.[5] ..... G01K 1/08

[52] U.S. Cl. ..... 374/158; 374/209; 128/664; 128/736; 206/306

[58] Field of Search ..... 374/158, 209; 206/606; 128/664, 736

[56] References Cited

U.S. PATENT DOCUMENTS

| | | |
|---|---|---|
| 738,960 | 9/1903 | Vaughan et al. . |
| 1,363,259 | 12/1920 | Mills . |
| 2,661,454 | 12/1953 | Wannamaker et al. . |
| 2,696,117 | 12/1954 | Harrison . |
| 3,190,436 | 6/1965 | Diamant . |
| 3,277,715 | 10/1966 | Vanderschmidt . |
| 3,282,106 | 11/1966 | Barnes . |
| 3,301,394 | 1/1967 | Baermann et al. . |
| 3,368,076 | 2/1968 | Clifford . |
| 3,469,685 | 9/1969 | Baermann . |
| 3,491,596 | 1/1970 | Dean . |
| 3,531,992 | 10/1970 | Moor . |
| 3,581,570 | 6/1971 | Wortz . |
| 3,673,868 | 7/1972 | Beury, III et al. . |
| 3,703,892 | 11/1972 | Meyers . |
| 3,822,593 | 7/1974 | Oudewaal . |
| 3,832,669 | 8/1974 | Muller et al. . |
| 3,833,115 | 9/1974 | Schapker . |
| 3,838,600 | 10/1974 | Ersek et al. . |
| 3,878,836 | 4/1975 | Twentier . |
| 3,942,891 | 3/1976 | Speilberger et al. . |
| 3,987,899 | 10/1976 | Vyprachticky . |
| 4,005,605 | 2/1977 | Michael . |
| 4,054,057 | 10/1977 | Kluge . |
| 4,061,226 | 12/1977 | Essen . |
| 4,091,922 | 5/1978 | Egler . |
| 4,159,766 | 7/1979 | Kluge ..... 374/209 |
| 4,241,828 | 12/1980 | Boudelle et al. . |
| 4,275,591 | 6/1981 | Wand . |

(List continued on next page.)

FOREIGN PATENT DOCUMENTS

| | | |
|---|---|---|
| 0044791 | 6/1982 | European Pat. Off. . |
| 0015647 | of 1902 | United Kingdom ..... 206/306 |
| 90/5902 | 5/1990 | World Int. Prop. O. . |

*Primary Examiner*—William A. Cuchlinski, Jr.
*Assistant Examiner*—Diego F. F. Gutierrez
*Attorney, Agent, or Firm*—Pretty, Schroeder, Brueggemann & Clark

[57] ABSTRACT

A probe cover assembly for use in covering and protecting the elongated probe of a medical thermometer. The assembly has three laminated layers, including a flat base layer with an aperture sized to slide over the probe, an intermediate stretchable film, and a protective paper layer having radially-aligned perforations aligned with the base layer aperture. In use, the probe cover assembly is placed on the probe by inserting the probe through the base layer aperture, from the assembly's paper layer side, to stretch the plastic film over the probe, with the perforated paper functioning initially to separate the probe from the film and thereby prevent the film from initially sticking to the probe and stretching unevenly. The probe cover assembly is removed from the probe and discarded by sliding the apertured base layer along the probe, with the perforated paper functioning to scrape the stretched film from the probe. The probe cover assembly is extremely compact and convenient to use, yet highly effective in reliably covering the probe and facilitating an accurate, repeatable measurement of a patient's temperature.

24 Claims, 1 Drawing Sheet

U.S. PATENT DOCUMENTS 4,301,682 11/1981 Everest .
4,380,998 4/1983 Kieffer, III et al. .
4,527,896 7/1985 Irani et al. .
4,588,306 5/1986 Burder et al. .
4,602,642 7/1986 O'Hara et al. .
4,634,294 1/1987 Christol et al. .
4,636,091 1/1987 Pompei et al. .
4,652,145 3/1987 Bjornberg .
4,662,360 5/1987 O'Hara et al. .
4,772,612 2/1988 Junkert et al. .
4,790,324 12/1988 O'Hara et al. .
4,863,281 9/1989 Suszynski .
4,895,164 1/1990 Wood .
4,932,789 6/1990 Egawa et al. .

FIG. 1
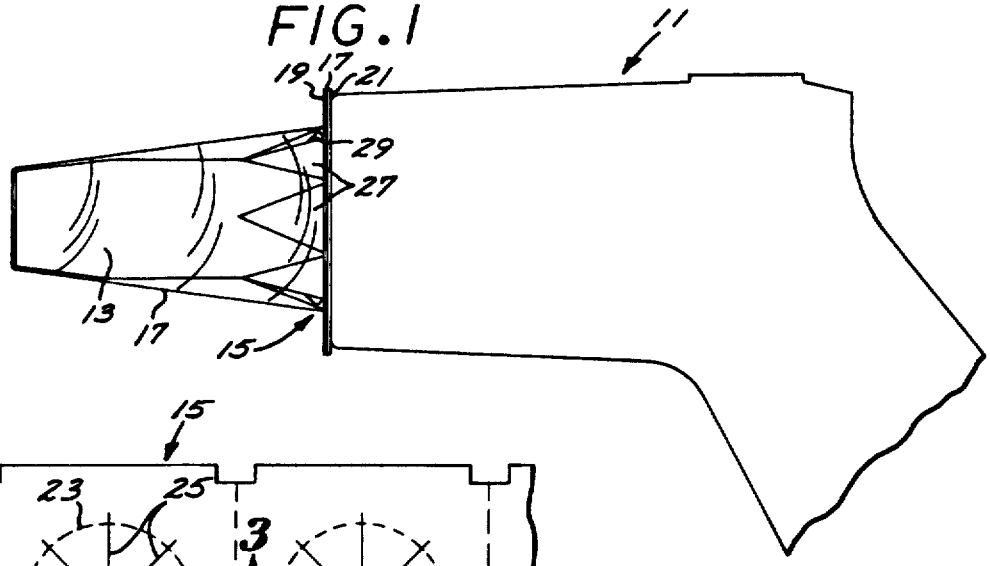
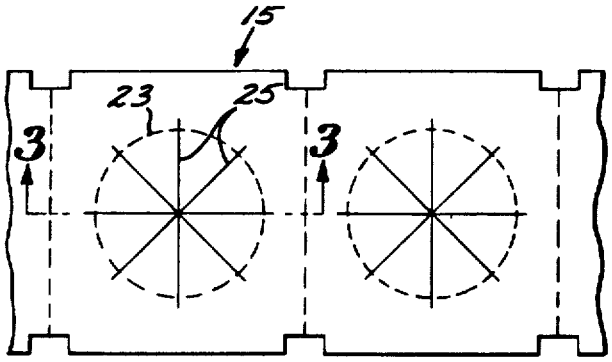
FIG. 2
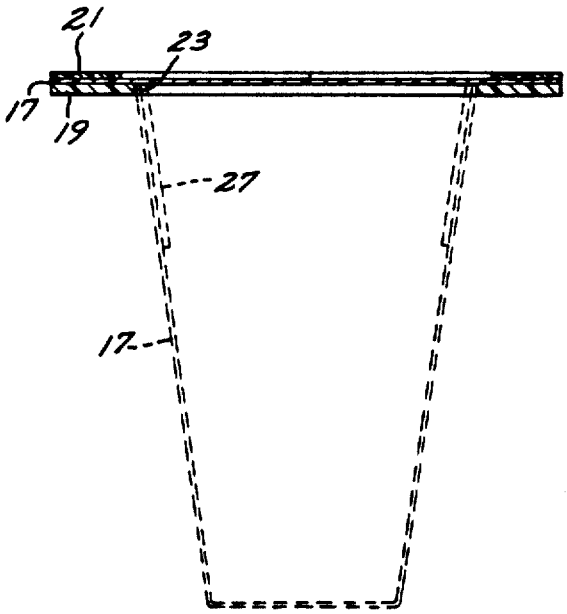
FIG. 3
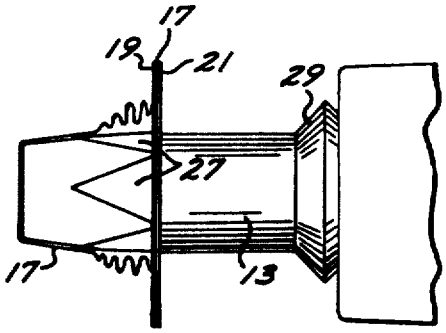
FIG. 4

DISPOSABLE PROBE COVER ASSEMBLY FOR MEDICAL THERMOMETER

Matter enclosed in heavy brackets [ ] appears in the original patent but forms no part of this reissue specification; matter printed in italics indicates the additions made by reissue.

BACKGROUND OF THE INVENTION

This invention relates generally to disposable assemblies for covering the elongated probe of a medical thermometer, and, more particularly, to assemblies of this kind that include a stretchable plastic film.

Medical thermometers of this particular kind, which include elongated probes adapted for insertion into various body cavities (e.g., the mouth, rectum or ear canal), are the most commonly used devices for measuring a patient's body temperature. Such thermometers commonly include in the probe tip a thermistor or infrared sensor to detect the temperature of the adjacent body tissue.

The use of medical thermometers of this kind to measure the body's temperatures of different patients raises a significant risk of spreading infection and disease. To reduce this risk, such thermometers are frequently used with hygienic probe covers that are disposed of after each use.

To be effective, such probe covers must have sufficient strength to withstand normal handling, including their placement on the probe, and also must be configured to interfere minimally with the sensor's (e.g., the thermistor's or infrared sensor's) temperature detection. In the case of the infrared sensor, the thickness of the portion of the probe cover located immediately in front of the sensor must be highly uniform and must be controlled to a precise tolerance.

It should, therefore, be appreciated that there is a continuing need for a probe cover assembly for the probe of a medical thermometer, which protects the probe and/or the patient from contamination during its use, which provides a known minimum interference with the probe's temperature sensor, and which is durable, yet convenient to use and inexpensive to manufacture. The present invention fulfills this need.

SUMMARY OF THE INVENTION

The present invention is embodied in a multi-layer, disposable probe cover assembly for the elongated probe of a medical thermometer, which is compact and convenient to use, yet interferes minimally with the thermometer's temperature detection. The probe cover assembly is simple to manufacture and compact for efficient storage, yet highly durable, and ensures that cross-contamination does not occur between the thermometer probe and the patient.

More particularly, the disposable cover assembly of the invention has three separate layers laminated together, including a thin, flat base layer, a stretchable plastic film, and a protective paper or plastic layer. The base layer has a generally circular aperture sized to slide over the elongated probe, and the base layer and paper layer are laminated to opposite sides of the plastic film, with the portion of the paper layer that is aligned with the base aperture being perforated. In use, the assembly is placed on the probe by inserting the probe through the base aperture, from the paper layer side of the assembly, to stretch the plastic film over the probe. During this stretching procedure, the perforated paper functions initially to separate the probe from the film and thereby prevent the film from initially sticking to the probe and stretching unevenly. After the patient's temperature has been measured, the cover assembly can be removed from the probe by sliding the apertured base layer along the probe, with the perforated paper functioning to scrape the stretched film from the probe. This ensures that the cover assembly, including the stretched film, will remain intact, for convenient disposal.

In a more detailed feature of the invention, the probe cover assembly is specifically adapted for use with thermometers that include an infrared sensor in or adjacent to its probe. The stretchable plastic film is therefore constructed of a material that is substantially transparent to infrared radiation, such as a linear, low-density polyethylene. This material preferably has an unstretched thickness of less than about 0.001 inches. The base layer, plastic film, and paper layer are preferably laminated to each other sonically. To facilitate such a sonic welding, the base layer is preferably formed of a high-density polyethylene, and the paper layer preferably has sufficient porosity to allow the base layer and plastic film to flow into it, to secure the successive layers together.

The perforations in the paper layer are preferably aligned generally radially, such that pie-shaped wedges are defined between them. Thus, upon insertion of the thermometer probe, the pie-shaped wedges initially separate the probe tip from the stretching plastic film, until the film has been stretched by more than the length of the wedges. This prevents the film from sticking to the probe at a point too early in its stretching, which could cause an uneven stretch and lead to an unreliable temperature measurement.

In yet another feature of the invention, the probe cover assembly is substantially flat prior to its use and it has a substantially square periphery. In addition, the assembly can be attached, via opposite sides of its square periphery, to a plurality of additional, substantially identical cover assemblies. This facilitates the use of a dispenser for automatically dispensing individual probe cover assemblies during use of the thermometer with multiple patients.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 1 is a side view of a medical thermometer having an elongated probe sized to fit within a patient's ear canal and having an infrared sensor for measuring a patient's body temperature, the thermometer being depicted with a probe cover assembly embodying the invention placed over the elongated probe.

FIG. 2 is a plan view of the probe cover assembly of FIG. 1, prior to its placement on the thermometer probe.

FIG. 3 is a side view of the probe cover assembly of FIG. 2, with the assembly's stretched configuration while in use covering a thermometer probe being shown in phantom lines.

FIG. 4 is a side view of the probe portion of the thermometer of FIG. 1, showing the probe cover assembly being ejected from the probe

DESCRIPTION OF THE PREFERRED EMBODIMENT

With reference now to the drawings, and particularly to FIG. 1, there is shown a medical thermometer 11 having an elongated, generally cylindrical probe 13 adapted for insertion into a patient's ear (not shown), with a disposable probe cover assembly 15 being used to cover the probe and thereby keep the probe hygienic. The probe includes an infrared sensor within it, for detecting infrared radiation being transmitted along the patient's ear canal and thereby determining the patient's body temperature. The probe cover assembly includes a stretchable film 17 that covers substantially the entire probe, to protect contamination from being transferred between the probe and the patient, yet that provides a minimum, known effect on the transmission of infrared radiation to the infrared sensor.

The probe cover assembly 15 is depicted in greater detail in FIGS. 2 and 3. The assembly has three laminated layers, including a base layer 19, the stretchable plastic film 17, and a paper layer 21. The base layer and paper layer are laminated securely to opposite sides of the film. Prior to placement of the assembly over the probe 13, the assembly is substantially flat, with a generally square periphery. At this time, the paper layer functions principally to protect the plastic film from damage during normal handling and to interconnect the assembly with similar, adjacent assemblies (not shown).

A circular aperture 23, which is formed in the middle of the base layer 19, is sized to slide easily over the generally cylindrical probe 13 of the thermometer 11. The portion of the paper layer 21 aligned with this aperture includes a plurality of perforations 25 oriented generally radially and spaced uniformly around the circle. Generally pie-shaped wedges 27 are thereby defined between the successive perforations.

The probe cover assembly 15 is placed over the probe 13 by pressing the probe's remote end through the aperture 23 of the base layer 19, from the assembly's paper layer side. This stretches the film over the probe, as shown in FIG. 1. During the initial stage of stretching, the paper layer provides a skid surface of the probe tip and the radial perforations 25 in the paper layer 21 assist in centering the probe tip relative to the base aperture. In addition, the paper layer separates the film from the probe tip until a predetermined, minimum amount of stretching has occurred. Consequently, the probe tip's initial contact with the film occurs over the tip's generally circular periphery, which minimizes the possibility of an uneven film stretch and the possibility of localized tearing of the film.

With reference again to FIG. 1, it will be observed that the probe cover assembly 15 is secured in place on the probe 13 by a snap-fit of the aperture 23 of the base layer 19 over an enlargement 29 located at the probe's base end. *As seen in FIGS. 1 and 3, at this point the film 17 has been stretched longitudinally by an amount at least as great as the diameter of the aperture 23.* To remove the probe cover assembly from the probe after it has been used to measure a patient's temperature, the base layer, which is relatively more rigid than are the film 17 and paper layer 21, is pushed forwardly by a reciprocable cylindrical sleeve (not shown), which is part of the thermometer 1. This sleeve can be moved forwardly to a point where it projects beyond the probe's remote tip, whereby the probe cover assembly can readily be disposed of.

The pie-shaped wedges 27 formed in the paper layer 21 serve an important function during the removal of the probe cover assembly 15 from the probe 13. In particular, and with reference to FIG. 4, it will be observed that these wedges are interposed between the probe 13 and the stretched film 17. As the reciprocating sleeve pushes the paper layer 21 and thus the base layer 19 forwardly, the wedges scrape the stretched film away from the probe surface and thus prevent the film from sticking to the probe and becoming inverted (like a stocking would become inverted during removal from a foot if only the stocking's open end were to be pulled). This feature ensures that the film will not remain stuck to the probe even after the base layer and the paper layer have been pushed beyond the probe's remote end.

With reference again to FIG. 3, the base layer 19, stretchable film 17, and paper layer 21 are laminated to each other using a conventional sonic welding process. In this process, a high frequency vibration is established in the three layers, which causes the plastic base layer and film to fuse together and which causes portions of the base layer and film to melt and flow into minute cavities in the paper layer, thus securely holding the three layers together. The effectiveness of this lamination process is enhanced if a non-parchment-type paper with at least limited porosity is used. In addition, using a conventional knurl to locally concentrate or direct the sonic welding energy further enhances the strength of the lamination.

Alternatively, the three layers, 17, 19 and 21 could be laminated together using other conventional heat-sealing methods or using a suitable adhesive. An adhesive approach is not preferred, however, because of an expected higher manufacturing cost.

The base layer 19 and stretchable plastic film 17 will fuse together most effectively if they are formed of similar plastic materials. Preferably, the base layer is formed of a high-density polyethylene material and the film is formed of a puncture-resistant, linear, low-density polyethylene material. The base layer has a thickness of at least about 0.010 inches, preferably 0.012 inches, which provides it with sufficient rigidity to allow convenient handling, but sufficient resilience to snap-fit over the enlargement 29 at the base end of the probe 13 (FIG. 1).

The stretchable plastic film 17 preferably has an unstretched thickness in the range of about 0.0005 to 0.00125 inches. This unstretched thickness will allow the stretched film to have sufficient strength to avoid puncturing and tearing yet to be sufficiently thin to provide minimal absorption of infrared radiation being transmitted from the patient's eardrum to the probe sensor. The film is preferably stretchable substantially uniformly in all directions. The film also can be coextruded with ethylene vinyl acetate, for added strength.

The paper layer 21 can be a standard 0.005-inch lithographic paper. Such a paper has the requisite porosity to facilitate the sonic welding described above and also has the desired thickness and resilience to isolate the stretchable plastic film 17 from the probe 13. An excessive paper layer thickness should be avoided, to prevent the possibility that the wedges might accidentally puncture the plastic film. The paper also should have low linting characteristics, to reduce the number of loose fibers being created when the perforations 25 are being cut and when the assembly is being placed on the probe 13.

With reference again to FIG. 2, it will be observed that the probe cover assembly 15 has a generally square periphery. This is a shape ideally suited to the manufacture of multiple side-by-side, substantially identical assemblies. Such assemblies can be connected to each other merely by the paper layer 21, which can be perforated along the edges separating the assemblies, as indicated by the reference numeral 33.

It should be appreciated from the foregoing description that the present invention provides an effective probe cover assembly for use in covering and protecting the elongated probe of a medical thermometer. The assembly has three laminated layers, including a flat base layer with an aperture sized to slide over the probe, an intermediate stretchable film, and a protective paper layer having perforations aligned with the base layer aperture. In use, the probe cover assembly is placed on the probe by inserting the probe through the base aperture, from the assembly's paper layer side, to stretch the plastic film over the probe, with the perforated paper functioning initially to separate the probe from the film and thereby prevent the film from initially sticking to the probe and stretching unevenly. The probe cover assembly is removed from the probe and discarded by sliding the apertured base layer along the probe, with the perforated paper functioning to scrape the stretched film from the probe. The probe cover assembly is extremely compact and convenient to use, yet highly effective in reliably covering the probe and facilitating an accurate, repeatable measurement of a patient's temperature.

Although the invention has been described in detail with reference only to the preferred embodiment, those of ordinary skill in the art will appreciate that various modifications can be made without departing from the invention. Accordingly, the invention is defined only by the following claims.

We claim:

1. A disposable probe cover assembly for an elongated, generally cylindrical probe of a medical thermometer, comprising:

a thin, flat base having a generally circular aperture sized to slide over an elongated, generally cylindrical probe of a medical thermometer;

a stretchable plastic film; and a protective layer;

wherein the base and protective layer are laminated to opposite sides of the plastic film, with the portion of the protective layer that is aligned with the base aperture being perforated;

wherein the cover assembly can be placed on the elongated probe by inserting the probe through the base aperture, from the protective layer side of the assembly, to stretch the plastic film over the probe, the perforated protective layer functioning initially to separate the film from the probe and thereby prevent the film from initially sticking to the probe and stretching unevenly;

and wherein the cover assembly can be removed from the elongated probe by sliding the apertured base along the probe, the perforated protective layer functioning to scrape the stretched film from the probe.

2. A disposable cover assembly as defined in claim 1, wherein the stretchable plastic film and the thin, flat base are both formed of polyethylene.

3. A disposable cover assembly as defined in claim 1, wherein:

the stretchable plastic film is substantially transparent to infrared radiation.

4. A disposable cover assembly as defined in claim 3, wherein the stretchable plastic film is formed of a linear, low-density polyethylene, with a uniform unstretched thickness in the range of 0.0005 to 0.00125 inches.

5. A disposable cover assembly as defined in claim 1, wherein:

the protective layer is formed of a paper having minute structural cavities; and the base, plastic film, and protective paper layer are laminated to each other sonically, with a portion of the base and plastic film flowing into the minute structural cavities of the paper layer, to secure the successive layers together.

6. A disposable cover assembly as defined in claim 1, wherein the paper layer includes a plurality of radially-aligned perforations spaced uniformly around the portion of the protective layer aligned with the generally circular base aperture.

7. A disposable cover assembly as defined in claim 1, wherein the cover assembly is substantially flat prior to its use in covering the elongated probe of the medical thermometer.

8. A disposable cover assembly as defined in claim 7, wherein:

the cover assembly has a substantially square periphery; and the cover assembly is attached, via opposite sides of its substantially square periphery, to a plurality of additional, substantially identical cover assemblies.

9. A disposable probe cover assembly adapted for use with an infrared sensitive medical thermometer having an elongated, generally cylindrical probe sized to fit within a patient's ear, the assembly comprising:

a stretchable plastic film substantially transparent to infrared radiation;

a thin, flat base layer laminated to one side of the plastic film, the base layer having a generally circular aperture size to slide over an elongated, generally cylindrical probe of an infrared-sensitive medical thermometer; and a protective layer laminated to the side of the plastic film opposite the base layer, with the portion of the protective layer that is aligned with the base aperture including generally radially-aligned perforations;

wherein the probe cover assembly can be placed on the elongated probe by inserting the probe through the aperture of the base layer, from the assembly's protective layer side, to stretch the plastic film over the probe and thereby prevent contaminants from moving between a probe and the patient's ear, the perforated protective layer functioning initially to separate the film from the probe and prevent the film from initially sticking to the probe and stretching unevenly;

and wherein the assembly can be removed from the elongated probe by sliding the base layer outwardly along the probe, with the perforated protective layer functioning to scrape the stretched film from the probe surface.

10. A disposable probe cover assembly as defined in claim 9, wherein:

the base layer is formed in a high-density polyethylene material, with a uniform thickness of at least about 0.010 inches; and the stretchable plastic film is formed of a linear, low-density polyethylene material, with a uniform thickness in the range of 0.0005 to 0.00125 inches.

11. A disposable probe cover assembly as defined in claim 9, wherein:

the protective paper layer is formed of a paper having minute structural cavities; and the base layer, plastic film, and protective paper layer are laminated to each other sonically, with a portion of the base layer and plastic film flowing into the minute structural cavities of the protective paper layer, to secure the successive layers together.

12. A disposable probe cover assembly as defined in claim 9, wherein the protective layer includes a plurality of radially-aligned perforations spaced uniformly around the portion of the protective layer aligned with the generally circular base aperture.

13. A disposable probe cover assembly as defined in claim 9, wherein the probe cover assembly is substantially flat prior to its use in covering the elongated probe of the medical thermometer.

14. A disposable probe cover assembly as defined in claim 13, wherein:

the probe cover assembly has a substantially square periphery; and the probe cover assembly is attached, via opposite sides of its substantially square periphery, to a plurality of additional, substantially identical cover assemblies.

15. A disposable probe cover assembly adapted for use with an infrared sensitive medical thermometer having an elongated, generally cylindrical probe sized to fit within a patient's ear, the assembly comprising:

a stretchable plastic film formed of a linear, low-density polyethylene material, with a uniform thickness in the range of 0.005 to 0.00125 inches, the film being substantially transparent to infrared radiation;

a thin, flat layer sonically welded to one side of the plastic film, the base layer being formed in a high-density polyethylene material, with a uniform thickness of at least about 0.010 inches, and having a circular aperture sized to slide over an elongated cylindrical probe of an infrared-sensitive medical thermometer; and a paper layer sonically welded to the side of the plastic film opposite the base layer, with the portion of the paper layer that is aligned with the base aperture including a plurality of uniformly-spaced, radially-aligned perforations;

wherein the probe cover assembly is substantially flat and can be placed on the elongated probe by inserting the probe through the aperture of the base layer, from the assembly's paper layer side, to stretch the plastic film over the probe and thereby prevent contaminants from moving between the probe and the patient's ear, the perforated paper layer functioning initially to separate the film from the probe and prevent the film from initially sticking to the probe and stretching unevenly;

and wherein the assembly can be removed from the elongated probe by sliding the base layer outwardly along the probe, with the perforated paper layer functioning to scrape the stretched film from the probe surface.

*16. A disposable probe cover assembly for an elongated probe of a medical thermometer having a remote end adapted for insertion into a body cavity and an opposite base end, comprising:*

*a base layer having an opening defined therethrough the opening sized sufficiently larger than the remote end of the probe so as to fit easily thereover and sufficiently smaller than at least a portion of the base end of the probe so as to engage the probe and be retained at its base end in a fixed position; and*

*a stretchable plastic film extending across the opening defined through the base layer, the film being affixed to the base layer around the periphery of the opening, and the film further being substantially flat prior to use in covering the probe,*

*wherein the probe cover assembly is configured to fit on the elongated probe by inserting the probe's remote end through the opening in the base layer to initially stretch the plastic film evenly over the probe's remote end and by then sliding the base layer along the probe to further stretch the plastic film until the base layer is retained at the base end of the probe.*

*17. A disposable probe cover assembly as defined in claim 16, wherein a rigid and fixed enlargement is formed at the base end of the probe, the base layer is formed of a resilient material, and the opening defined through the base layer is sized to snap over the rigid and fixed enlargement at the base end of the probe.*

*18. A disposable probe cover assembly as defined in claim 16, wherein the stretchable plastic film is substantially transparent to infrared radiation.*

*19. A disposable probe cover assembly as defined in claim 18, wherein the stretchable plastic film is formed of a low-density polyethylene material.*

*20. A disposable probe cover assembly as defined in claim 16, wherein the stretchable plastic film is affixed to the base layer by lamination to one side thereof.*

*21. A disposable probe cover assembly as defined in claim 20, wherein the stretchable plastic film is laminated to the side of the base layer from which the probe is intended to be inserted.*

*22. A disposable probe cover assembly as defined in claim 16, and further including means for detachably connecting the probe cover assembly along at least one of its edges to another, substantially identical probe cover assembly.*

*23. A disposable probe cover assembly as defined in claim 16, further including a protective layer affixed to one side of the plastic film, and wherein the probe cover assembly is detachably connected via the protective layer along at least one edge of the protective layer to another, substantially identical probe cover assembly.*

*24. A disposable probe cover assembly for an elongated probe of a medical thermometer having a remote end adapted for insertion into a body cavity and an opposite base end with a rigid and fixed enlargement formed thereon, comprising:*

*a flat base layer formed of a resilient material, the base layer having a generally circular opening defined therethrough, the opening being sized to fit over the remote end of the probe and to be retained in a fixed position at the base end of the probe by a snap fit over the rigid and fixed enlargement formed on the base end of the probe; and*

*a stretchable plastic film formed of a low-density polyethylene material that is substantially transparent to*

*infrared radiation, the plastic film extending across the opening defined through the base layer and being affixed to the base layer around the periphery of the opening, and the film further being substantially flat prior to use in covering the probe,*

*wherein the probe cover assembly is configured to fit on the elongated probe by inserting the probe's remote end through the opening in the base layer to initially stretch the plastic film evenly over the probe's remote end, and by then stretching the plastic film along the probe by sliding the base layer until the opening defined in the base layer snaps over the rigid and fixed enlargement at the base end of the probe, the plastic film being stretched longitudinally by an amount at least as great as the diameter of the opening defined through the base layer.*

* * * * *